(12) United States Patent
Patterson

(10) Patent No.: US 6,362,791 B1
(45) Date of Patent: Mar. 26, 2002

(54) PORTABLE COMMUNICATION DEVICE HOLDER AND ANTENNA

(75) Inventor: Gregory Scott Patterson, Morrisville, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/521,345

(22) Filed: Mar. 9, 2000

(51) Int. Cl.$^7$ ................................................ H01Q 1/24
(52) U.S. Cl. .................. 343/702; 343/878; 343/880; 455/575
(58) Field of Search ................................ 343/702, 712, 343/713, 718, 878, 880, 883, 882; 455/348, 351, 575, 90, 345, 346, 347, 349; 248/537, 683; H01Q 1/24, 1/32

(56) References Cited

U.S. PATENT DOCUMENTS

| | | | |
|---|---|---|---|
| 5,281,970 A | * | 1/1994 | Blaese ........................ 343/878 |
| 5,649,316 A | | 7/1997 | Prudhomme et al. ........ 455/345 |
| 5,861,857 A | | 1/1999 | Kozak ......................... 343/711 |
| 5,945,956 A | | 8/1999 | Izawa et al. ................. 343/713 |

* cited by examiner

Primary Examiner—Michael C. Wimer
(74) Attorney, Agent, or Firm—Myers Bigel Sibley & Sajovec

(57) ABSTRACT

An antenna designed integral to a windshield holder for a portable communications device is provided. The antenna can be an integral part of the windshield holder or an attachment to it. The windshield holder attaches to the windshield of a vehicle by a securing mount to which is attached an extension. The extension has attached, at a location different from the securing mount, a device mount for a portable communications device. The securing mount, device mount, and extension may all be adjustable for mounting in varying positions and locations. The windshield holder is easily attached and removed from the windshield improving both transportability and security. The antenna connects to the phone by a connector or interface at the phone mount, either automatically, when the portable communications device is inserted in the device mount, or by a separate operation.

8 Claims, 4 Drawing Sheets

PORTABLE COMMUNICATION DEVICE HOLDER AND ANTENNA

BACKGROUND OF THE INVENTION

1. Field of the Invention

The present invention relates generally to a holder for a portable communications device with an integral antenna and, more particularly, to a portable communications device holder capable of being secured in a vehicle and which positions the portable communications device and antenna in a optimum usable manner. The holder is easily transportable from one position to another, and incorporates an antenna which can be connected or disconnected from the portable communications device as the portable communications device is attached to or removed from the holder, respectively.

2. Description of the Related Art

In the field of portable communications device holders, many accessories such as stands, chargers, and cradles are used to hold and position portable communications devices and to connect external devices such as antennas and power supplies to the portable communications devices. Communication using a portable communications device with its own antenna inside a partially electromagnetically shielded environment such as a vehicle is less than optimum, so that an external antenna for the portable communications device is desirable for acceptable operation, particularly in weak signal areas. Various antenna configurations, both internal and external to the vehicle, have been tried to address this problem. These various antenna configurations have failed to gain market acceptance due to their lack of portability, their susceptibility to vandalism, and their poor cosmetic effect on vehicles.

Antennas, in the related art, are shown built into windshield wipers, the exterior trim, the rearview mirror, the sun-visor, and the dashboard of a vehicle. This art teaches antennas built into a part of the vehicle and are not easily removable. Additionally, the antennas shown in the prior art are each shown attached separate from the portable communications device holder and therefore require a cable which is either cosmetically undesirable, or is installed in a way that limits location and portability.

There are several of these antennas available in the related art disclosed in: U.S. Pat. No. 5,861,857, issued in the name of Kozak and entitled Vehicular Windshield Wiper Antenna System; U.S. Pat. No. 5,945,956, issued in the name of Izawa, et al. and entitled Vehicular Exterior Trim Accessory having a Built-in Antenna; and U.S. Pat. No. 5,649,316, issued in the name of Prudhomme, et al. and entitled In-Vehicle Antenna.

These known antennas are mounted separate from the holder for the portable communications device and are connected to the portable communications device with a connector and cable routed from the antenna to the portable communications device holder.

There have been attempts to make installation of holders and antennas in vehicles easier, but no solution has proposed an antenna that is integral with the holder so that the antenna and the holder may be positioned as one unit for optimal performance.

BRIEF SUMMARY OF THE INVENTION

According to the present invention, a holder for a portable communications device is shown with an antenna integrally mounted within a securing mount for the holder.

According to a preferred embodiment of the present invention, a holder for a portable communications device is provided, which includes: a securing mount for securing the holder to a vehicle windshield or other surface, a device mount connected to the securing mount and containing an RF connector for connection to the portable communications device, an antenna integral with the holder and connected to the RF connector, wherein the holder is easily removed from or attached to its secured position. The connection of the securing mount to the device mount may include an extension so that the securing mount and the device mount may be optimally positioned.

In another embodiment of the present invention a holder for a portable communications device is provided, including: a securing mount for securing one end of the holder to a vehicle windshield or other surface, an extension pivotally connected on one end to the securing mount and containing an RF cable coupled on one end to an antenna attached to the extension, a device mount pivotally connected on the other end of the extension and containing an RF connector coupled to the other end of the RF cable for connection to a portable communications device, and wherein the holder is easily removed from or attached to its secured position.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Detailed Description of the Figures

The present invention is a holder for a portable communications device, the holder including a device mount, a securing mount, an antenna, and, alternatively, an extension. The holder may be mounted, for example, in a vehicle, a dwelling, a building, or on a wall, for receiving a portable communications device. Such portable communications devices may include, but are not limited to, cellular phones, two way radios, walkie talkies, and satellite phones, and may be usefully mounted in vehicles such as automobiles, trucks, boats, and airplanes. The securing mount is for attaching the holder to a desired location and may use suction, adhesion, magnetism, or mechanical means for attachment. The attachment means may be user detachable. The securing mount may include a universal mount separable from a device specific mount that together make up the securing mount which is easily modified for different applications by changing the device specific mount. The antenna may be built integral with the securing mount by being formed on, into, or inside of the securing mount, or may be formed in, on, or attached to, the extension or the phone mount. The extension provides a way for the device mount to be located away from, and adjusted relative to, the securing mount. A cable or RF connection may be provided from the antenna to the device mount. The device mount provides a way to receive the portable communications device and a means for coupling the antenna to the device.

Figure 1:
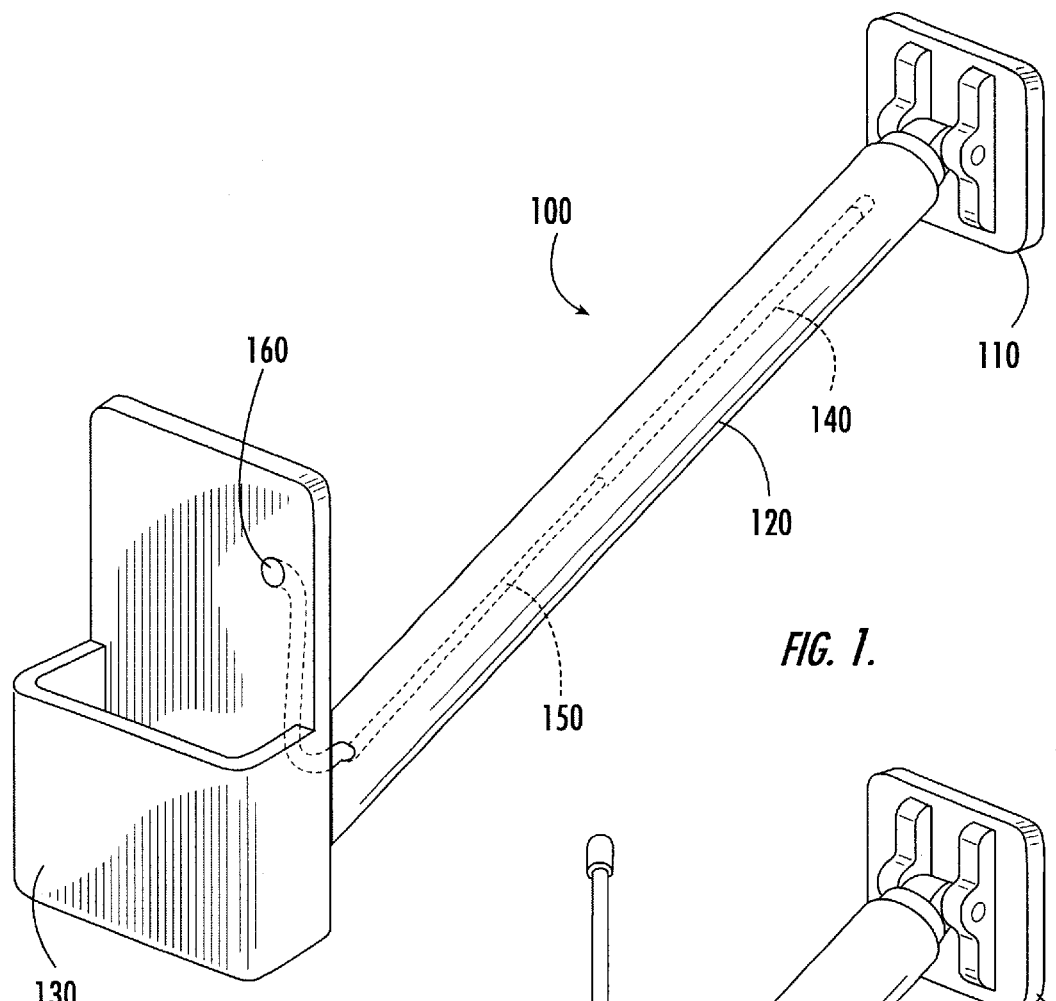
FIG. 1 is a drawing showing a preferred embodiment of the portable communications device holder with the antenna incorporated within the extension.

Referring now to FIG. 1, a portable communications device holder 100 is shown in accordance with a first preferred embodiment of the present invention. As shown in FIG. 1, the holder 100 includes a securing mount 110, an extension 120, an antenna 140, an RF conductor 150, an RF connector 160, and a device mount 130. Securing mount 110 provides a means for mounting the mount to a surface by suction, adhesion, mechanical interface, or magnetism and may be adjustably fastened to a first end of extension 120. The device mount 130 is adjustably mounted to a second end of extension 120 and includes a means for mounting a portable communications device. The antenna 140 is contained within extension 120 and coupled with a first end of RF conductor 150 whose second end is coupled to RF connector 160. RF connector 160 is secured to device mount 130.

Figure 2:
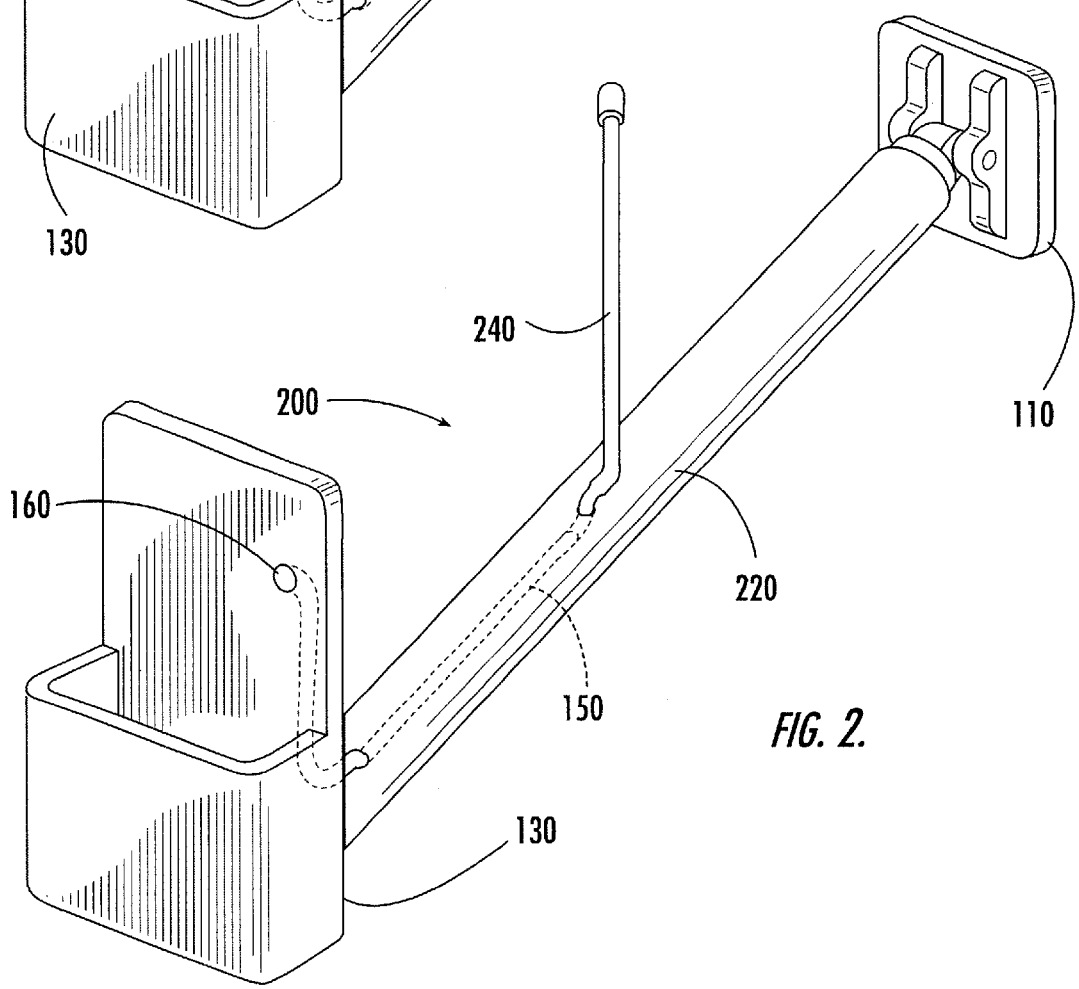
FIG. 2 is a drawing showing an embodiment of the present invention with the antenna external to the extension.

Referring now to FIG. 2, a portable communications device holder 200 is shown in accordance with a second embodiment of the present invention. As shown in FIG. 2, the holder 200 may include a securing mount 110, an extension 220, an antenna 240, an RF conductor 150, an RF connector 160, and a device mount 130. The securing mount 110 provides a means for mounting the securing mount to a surface and is adjustably fastened to a first end of extension 220. Extension 220 may include an antenna attached thereto. The device mount 130 is adjustably mounted to a second end of extension 220 and includes a means for mounting a portable communications device. The antenna 240 is attached to extension 220 and coupled to a first end of RF conductor 150 whose second end is coupled to RF connector 160. RF connector 160 is secured to device mount 130.

Figure 3:
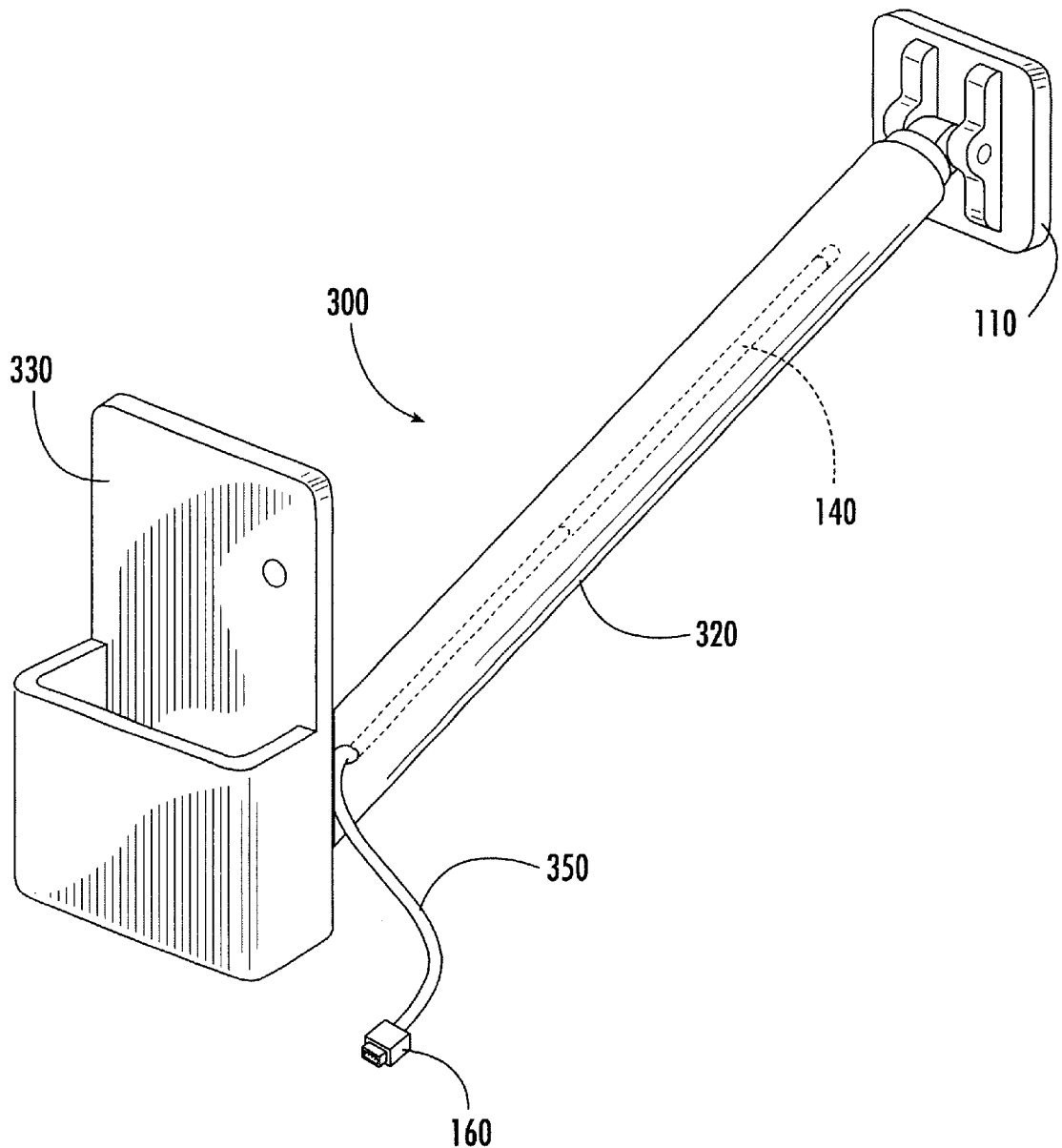
FIG. 3 is a drawing showing an embodiment of the present invention with the mounting of the portable communications device separate from the antenna connection to the portable communications device.

Referring now to FIG. 3, a portable communications device holder 300 is shown in accordance with a third embodiment of the present invention. As shown in FIG. 3, the holder 300 may include a securing mount 110, an extension 320, an antenna 140, an RF conductor 350, an RF connector 160, and a device mount 330. The securing mount 110 provides a means for mounting the securing mount to a surface and is adjustably fastened to a first end of extension 320. Extension 320 may include an antenna attached thereto. The device mount 330 is adjustably mounted to a second end of extension 320 and includes a means for mounting a portable communications device. Antenna 140 is attached to extension 320 and coupled to a first end of RF conductor 350 whose second end is coupled to RF connector 160.

Figure 4:
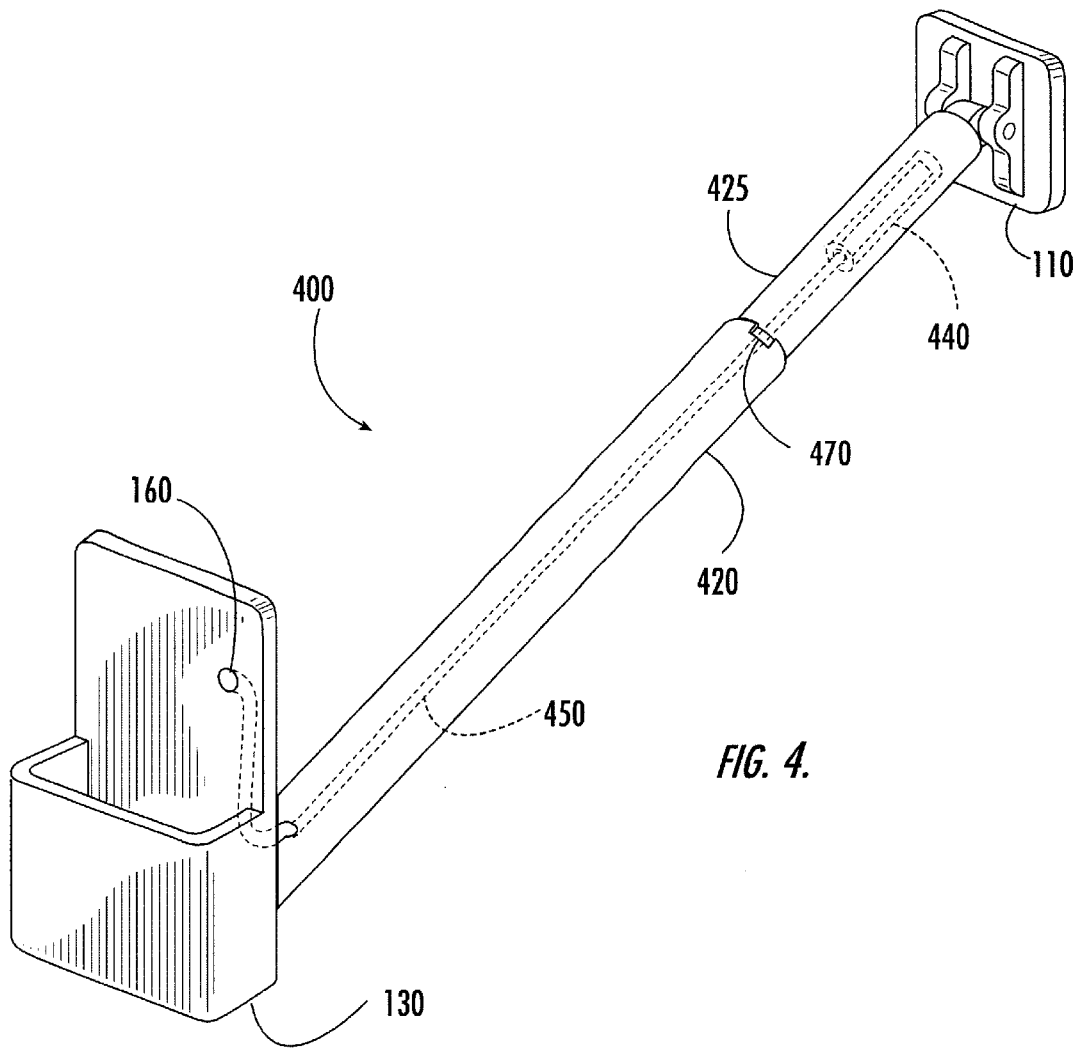
FIG. 4 is a drawing showing an embodiment of the present invention in which the device mount includes an adjustable length extension.

Referring now to FIG. 4, a portable communications device holder 400 is shown in accordance with a preferred embodiment of the present invention. As shown in FIG. 4, the holder 400 may include a securing mount 110, a first extension 425, a second extension 420, a latch 470, an antenna 440, an RF conductor 450, an RF connector 160, and a device mount 130 thereby to provide a holder. The securing mount 110 provides a means for mounting the securing mount to a surface and is adjustably fastened to one end of first extension 425. The second end of extension 425 is slidably connected to the first end of second extension 420. The second end of extension 420 is adjustably connected to device mount 130. Latch 470 secures the position of extension 420 relative to extension 425. The antenna 440 is contained within extension 425 and coupled with a first end of RF conductor 450 and allows movement of extension 420 relative to extension 425 and whose second end is coupled to RF connector 160. RF connector 160 is secured by device mount 130.

Figure 5:
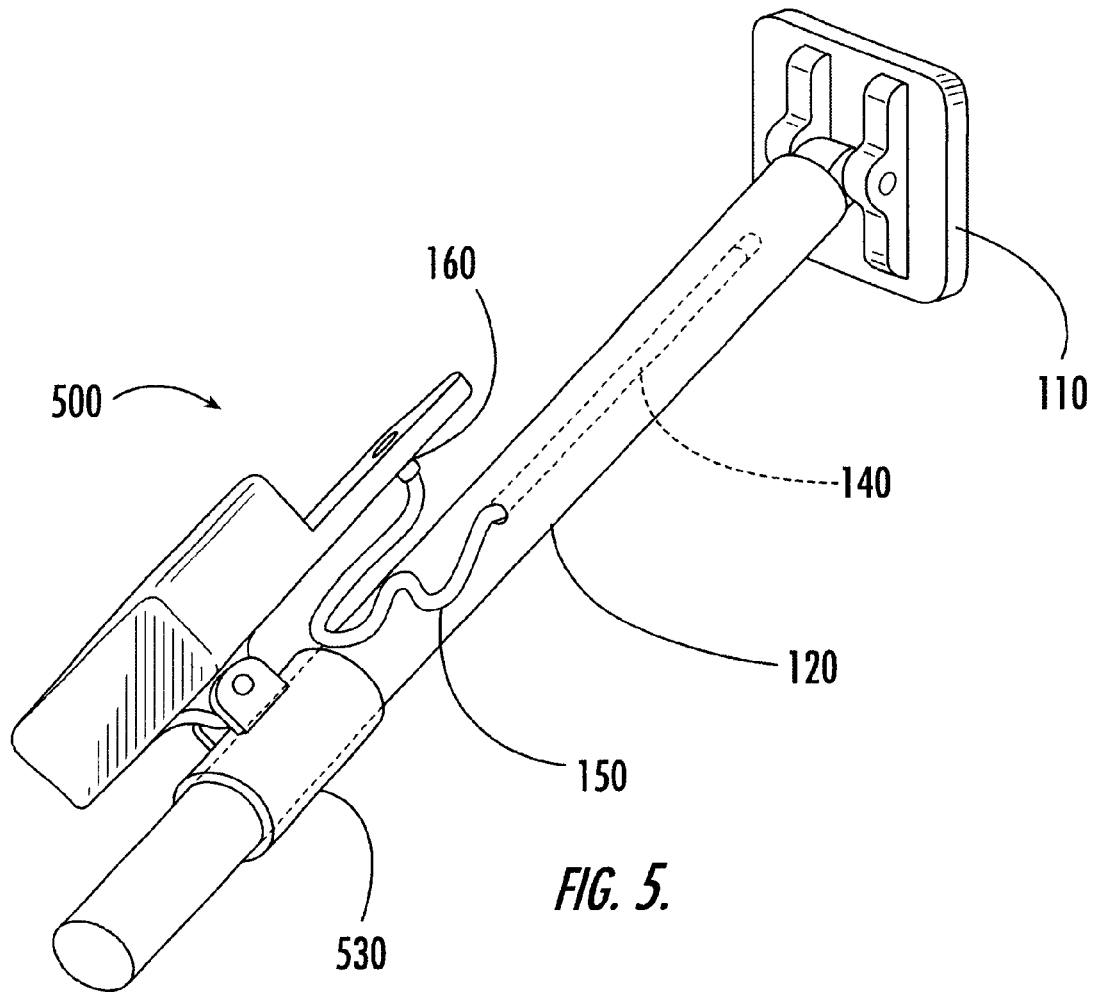
FIG. 5 is a drawing showing a preferred embodiment of the portable communications device holder with the device mount adjustable to different positions on the extension.

Referring now to FIG. 5, a portable communications device holder 500 is shown in accordance with a preferred embodiment of the present invention. As shown in FIG. 5, the holder 500 may include a securing mount 110, an extension 120, an antenna 140, an RF conductor 150, an RF connector 160, and a device mount 530 thereby to provide a holder. The securing mount 110 provides a means for mounting the mount to a surface and is adjustably fastened to a first end of extension 120. The device mount 530 is mounted to extension 120 for slidable adjustment along extension 120 and includes a means for mounting a portable communications device. The antenna 140 is contained within extension 120 and coupled with a first end of RF conductor 150 whose second end is coupled to RF connector 160. RF connector 160 is secured to device mount 130.

With reference to FIG. 1, in operation, the portable communications device holder 100 may be mounted in a vehicle as shown in FIG. 1 by using securing mount 110 which may include a suction cup for securing to the inside of the windshield. The device mount 130 may be positioned and angled to a desirable location by the user. A portable communications device may be set in the device mount 130 whereby the RF connector 160 makes an RF connection to the portable communications device. The RF connector 160 is conductively coupled to a first end of RF conductor 150 and the second end of RF conductor 150 is conductively coupled to antenna 140. Antenna 140 is therefore coupled to the portable communications device installed in device mount 130 thereby providing improved reception and transmission performance because the antenna can be of optimum size, it may be elevated relative to the portable communications device, and the antenna may be less shielded by the body of the vehicle in which it is installed than the portable communications device.

Alternatively, the portable communications device holder 200 shown in FIG. 2 may be mounted in a vehicle in the same fashion as shown in FIG. 1. The operation is similar to that shown in FIG. 1 except that the antenna 240 is externally fastened to extension 220 and may be oriented somewhat independent of extension 220.

FIG. 3 shows an embodiment implemented with the RF connector 160 separate from device holder 130. In this embodiment the portable communications device may be set in the device mount whereby the RF connector 160 does not automatically make an RF connection to the portable communications device. The RF connector 160 is conductively coupled to a first end of RF conductor 350 which is at least partially unconstrained by extension 320, and RF conductor 350 is unattached to device mount 330. Antenna 140 is therefore coupled to the portable communications device, installed in device mount 330, by an operation separate from inserting the portable communications device in the device mount 330.

FIG. 4 shows an embodiment including telescoping extensions 420 and 425. The first end of extension 420 is attached to device mount 130 and the second end is slidably engaged with the first end of extension 425. The second end of extension 425 is attached to securing mount 110. The RF connector 160 is conductively coupled to a first end of RF conductor 450. RF conductor 450 is contained by extension 420 and its second end is coupled to antenna 440. Antenna 440 is contained by extension 425. The movement of extension 420 relative to extension 425 is facilitated by the RF conductor 450 so that the length of the extensions 420 and 425 may be adjustable.

Thus, there has been shown and described an apparatus for providing an improved and portable holder and antenna for a portable communications device which fulfills all the objects and advantages sought therefore. Many changes, modifications, variations and other uses and applications of the subject invention will, however, become apparent to those skilled in the art after considering this specification and the accompanying drawings which disclose a preferred embodiment thereof. All such changes, modifications, variations and other uses and applications which do not depart from the spirit and scope of the invention are deemed to be covered by the invention which is limited only by the claims which follow.

What is claimed is:

1. An apparatus for holding a portable communications device, said apparatus comprising:
   a device mount for holding said portable communications device;
   a securing mount for securing said device mount;
   an extension coupled on a first end to said device mount and on a second end to said securing mount; and
   an antenna integral with said extension.

2. The apparatus for holding a portable communications device according to claim 1, wherein RF connection is made between said antenna and said portable communications device when said portable communications device is inserted in said device mount.

3. The apparatus for holding a portable communications device according to claim 1, wherein said device mount is movably connected to said securing mount.

4. The apparatus for holding a portable communications device according to claim 1, wherein said securing mount is configured to be removably attached to a surface.

5. The apparatus for holding a portable communications device according to claim 1, wherein:
   said extension consists of a first extension and a second extension;
   said first extension has a first end connected to said securing mount; and
   said second extension has a first end adjustably engaged to a second end of said first extension and a second end connected to said device mount.

6. The apparatus for holding a portable communications device according to claim 5, further comprising a means for adjusting the characteristics of said antenna as a result of the position of said first extension relative to said second extension.

7. The apparatus for holding a portable communications device according to claim 5, further comprising a means for latching the position of said first extension relative to said second extension.

8. The apparatus for holding a portable communications device according to claim 3, wherein said device mount is removably attached to said securing mount.

* * * * *